United States Patent
Osakabe

(10) Patent No.: US 6,894,961 B1
(45) Date of Patent: May 17, 2005

(54) RECORDABLE OPTICAL DISK AND OPTICAL DISK RECORDING DEVICE UTILIZING PRE-RECORDED RECORDING SPEED INFORMATION

(75) Inventor: Katsuichi Osakabe, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/412,736

(22) Filed: Oct. 4, 1999

(30) Foreign Application Priority Data

Oct. 5, 1998 (JP) ............................................. 10-296230

(51) Int. Cl.$^7$ ................................................ G11B 5/09
(52) U.S. Cl. .................... 369/47.47; 369/53.3
(58) Field of Search .......................... 369/47.23, 47.27, 369/47.28, 47.3, 47.31, 47.38, 47.39, 47.46, 47.47, 47.55, 53.2, 53.3, 53.41, 53.37, 53.43, 53.45, 275.3

(56) References Cited

U.S. PATENT DOCUMENTS

| | | | |
|---|---|---|---|
| 4,807,209 A | 2/1989 | Kramer et al. | |
| 5,502,702 A | 3/1996 | Nakajo | |
| 5,835,462 A | 11/1998 | Mimnagh | |
| 6,072,759 A | * | 6/2000 | Maeda et al. ............ 369/275.3 |

* cited by examiner

Primary Examiner—Paul W. Huber
(74) Attorney, Agent, or Firm—Morrison & Foerster LLP

(57) ABSTRACT

Information indicative of disk-applicable recording speeds is incorporated in lead-out start time information within ATIP information that is recorded in pre-grooves located in a lead-in area of an optical disk. Once the optical disk is inserted in an optical disk recording device, the lead-out start time information is read out, so that recording is performed on the optical disk after a recording speed is automatically set to a highest settable speed value within a range specified by the read-out lead-out start time information. This arrangement can reliably prevent recording at speeds beyond predetermined limit values unique to the optical disk.

5 Claims, 4 Drawing Sheets

RECORDABLE OPTICAL DISK AND OPTICAL DISK RECORDING DEVICE UTILIZING PRE-RECORDED RECORDING SPEED INFORMATION

BACKGROUND OF THE INVENTION

The present invention relates to a recordable optical disk where information indicative of recording speeds suitably applicable to the disk is recorded in pre-groove wobbles or pre-pits of the optical disk, and a device for recording on the recordable optical disk.

In the field of optical disk recording devices for recording desired information on a recordable optical disk, various efforts have been made to increase a recording speed, in order to reduce a time required for recording on the optical disk.

Upper and lower limit values of the recording speed, within which accurate reproduction of the recorded information is permitted, depend on the type and maker (manufacturer) of each optical disk used. Thus, when, for example, an optical disk non-adaptable to eight-times speed recording (i.e., recording at a speed eight times higher than a normal reproduction speed) is subjected to the eight-times speed recording by an optical disk recording device that is capable of such eight-times speed recording, desired information would be recorded on the optical disk with so many errors that the recorded information can not be reproduced at all.

SUMMARY OF THE INVENTION

It is therefore an object of the present invention to provide a recordable optical disk and an optical disk recording device which can reliably prevent recording at speeds beyond predetermined limit values unique to the optical disk and thereby permit recording on the optical disk with minimized errors.

In order to accomplish the above-mentioned object, the present invention provides a recordable optical disk characterized in that disk-applicable-recording-speed information, i.e., information indicative of recording speeds suitably applicable to the optical disk, is pre-recorded on a disk's track during manufacture of the optical disk. Thus, by reading out the disk-applicable-recording-speed information from the track prior to recording, the actual recording speed for the optical disk can be set to a speed value within a range of the disk-applicable recording speeds, which permits recording with minimized errors.

The disk-applicable-recording-speed information can be incorporated in either one or both of lead-in start time information and lead-out start time information recorded in pre-groove wobbles or pre-pits of the optical disk; in this case, the recorded lead-in start time information and lead-out start time may be the same as or different from those in the actual lead-in area of the optical disk. The disk-applicable-recording-speed information may be information representing an upper limit (greatest allowable) value of the disk-applicable recording speeds. Alternatively, the disk-applicable-recording-speed information may be information representing lower and upper limit (smallest and greatest allowable) values of the disk-applicable recording speeds, in which case one of the lower and upper limit values of the disk-applicable recording speeds may be incorporated in the lead-in start time information recorded in the pre-groove wobbles or pre-pits of the optical disk and the other of the lower and upper limit values of the disk-applicable recording speeds may be incorporated in the lead-out start time information recorded in the pre-groove wobbles or pre-pits of the optical disk. In another alternative, both of the lower and upper limit values of the disk-applicable recording speeds may be incorporated in either one or both of the lead-in start time information and the lead-out start time information. According to the present invention, the disk-applicable-recording-speed information may be recorded in a disk's program area, lead-out area or the like, in place of or in addition to the lead-in area.

The present invention also provides an optical disk recording device which comprises: an disk-applicable-recording-speed information reproducing circuit that reproduces, from among disk readout signals generated by reading an optical disk to be recorded on, disk-applicable-recording-speed information pre-recorded on a track of the optical disk during manufacture of the optical disk; and a control circuit that performs recording on the optical disk after setting a recording speed for the optical disk to a predetermined speed value within a range specified by the disk-applicable-recording-speed information reproduced by the disk-applicable-recording-speed information reproducing circuit. In this optical disk recording device, recording can be performed on the recordable optical disk with the disk-applicable-recording-speed information pre-recorded on a disk track during manufacture of the optical disk, using the recording speed set to a speed value within a range of the disk-applicable recording speeds indicated by the disk-applicable-recording-speed information. Thus, the recording can be executed with minimized errors. Note that in the case where the disk-applicable-recording-speed information is recorded in the pre-groove wobbles or pre-pits of the optical disk, the disk-applicable-recording-speed information reproducing circuit reproduces the disk-applicable-recording-speed information from the pre-groove wobbles or pre-pits.

Further, the present invention provides an optical disk recording device for recording on an optical disk where disk-applicable-recording-speed information is incorporated in either one or both of lead-in start time information and lead-out start time information recorded in pre-groove wobbles or pre-pits of the optical disk, which comprises: a time information reproducing circuit that reproduces, from among disk readout signals generated by reading the optical disk to be recorded on, either one or both of the lead-in start time information and the lead-out start time information recorded in the pre-groove wobbles or pre-pits of the optical disk; and a control circuit that determines disk-applicable recording speeds on the basis of either one or both of the lead-in start time information and the lead-out start time information reproduced by the time information reproducing circuit and performs recording on the optical disk after setting a recording speed for the optical disk to a speed value within a range of the determined disk-applicable recording speeds. In this inventive optical disk recording device, recording can be performed on the recordable optical disk with the disk-applicable-recording-speed information incorporated in either one or both of the lead-in start time information and the lead-out start time information recorded in the pre-groove wobbles or pre-pits of the optical disk, using the recording speed set to a speed value within a range of the disk-applicable recording speeds indicated by the disk-applicable-recording-speed information. Thus, the recording can be executed with minimized errors. Note that in the case where the disk-applicable-recording-speed information is information indicative of an upper limit value of the disk-applicable recording speeds and incorporated in either one or both of the lead-in start time information and the lead-out start time information recorded in the pre-groove wobbles or pre-pits of the optical disk, the control circuit sets the recording speed for the optical disk to a value not exceeding the upper limit value of the disk-applicable recording speeds.

The present invention further provides an optical disk recording device for recording on a recordable optical disk where one of lower and upper limit values of disk-applicable recording speeds is incorporated in lead-in start time information recorded in pre-groove wobbles or pre-pits of the optical disk and the other of the lower and upper limit values of the disk-applicable recording speeds is incorporated in lead-out start time information recorded in the pre-groove wobbles or pre-pits of the optical disk, which comprises a time information reproducing circuit that reproduces, from among disk readout signals generated by reading the optical disk to be recorded on, the lead-in start time information and the lead-out start time information recorded in the pre-groove wobbles or pre-pits of the optical disk; and a control circuit that determines one of the lower and upper limit values of the disk-applicable recording speeds on the basis of the lead-in start time information reproduced by the time information reproducing circuit and the other of the lower and upper limit values of the disk-applicable recording speeds on the basis of the lead-out start time information reproduced by the time information reproducing circuit and performs recording on the optical disk after setting a recording speed for the optical disk to a speed value within a range of the lower limit value to the upper limit value of the disk-applicable recording speeds. In this inventive optical disk recording device, recording can be performed on the recordable optical disk with the recording speed set to a speed value within a range specified by the lower and upper limit values of the disk-applicable recording speeds. Thus, the recording can be executed with minimized errors.

The present invention further provides an optical disk recording device for recording on a recordable optical disk where both of lower and upper limit values of disk-applicable recording speeds are incorporated in either one or both of lead-in start time information and lead-out start time information recorded in pre-groove wobbles or pre-pits of the optical disk, which comprises: a time information reproducing circuit that reproduces, from among disk readout signals generated by reading the optical disk to be recorded on, the lead-in start time information or lead-out start time information recorded in the pre-groove wobbles or pre-pits of the optical disk; and a control circuit that determines the lower and upper limit values of the disk-applicable recording speeds on the basis of the lead-in start time information or lead-out start time information reproduced by the time information reproducing circuit and performs recording on the optical disk after setting a recording speed for the optical disk to a speed value within a range of the lower limit value to the upper limit value of the disk-applicable recording speeds. In this inventive optical disk recording device, recording can be performed on the recordable optical disk with the recording speed set to a speed value within a range specified by the lower and upper limit values of the disk-applicable recording speeds. Thus, the recording can be executed with minimized errors. Note that the control circuit in this optical disk recording device may set the recording speed for the optical disk to, for example, a greatest speed value settable within the range of the disk-applicable recording speeds.

The present invention also provides an optical disk recording device which comprises: an disk-applicable-recording-speed information reproducing circuit that reproduces, from among disk readout signals generated by reading an optical disk to be recorded on, disk-applicable-recording-speed information pre-recorded on a track of the optical disk during manufacture of the optical disk; a display unit that displays disk-applicable recording speeds on the basis of the disk-applicable-recording-speed information reproduced by the disk-applicable-recording-speed information reproducing circuit; a recording speed designating section that designates a particular recording speed value on the basis of an operation by a user; and a control circuit that performs recording on the optical disk after setting a recording speed for the optical disk to the particular recording speed value designated by the recording speed designating section. With this inventive optical disk recording device, the user can set the recording speed to a speed value within the range of the displayed disk-applicable recording speeds by carrying out a manual input operation or the like while viewing the display on the display unit. Thus, the recording can be executed with minimized errors. Note that in the case where the disk-applicable-recording-speed information is recorded in the pre-groove wobbles or pre-pits of the optical disk, the disk-applicable-recording-speed information reproducing circuit reproduces the disk-applicable-recording-speed information from the pre-groove wobbles or pre-pits.

Finally, the present invention provides an optical disk recording device for recording on a recordable optical disk where disk-applicable-recording-speed information is incorporated in either one or both of lead-in start time information and lead-out start time information recorded in pre-groove wobbles or pre-pits of the optical disk, which comprises: an disk-applicable-recording-speed information storage circuit that stores therein correspondencies between values of either one or both of the lead-in start time information and the lead-out start time information recorded in the pre-groove wobbles or pre-pits of the optical disk and values of disk-applicable recording speeds; a time information reproducing circuit that reproduces, from among disk readout signals generated by reading the optical disk to be recorded on, either one or both of the lead-in start time information and the lead-out start time information recorded in the pre-groove wobbles or pre-pits of the optical disk; a display unit that displays the disk-applicable-recording-speed information that is read out from the disk-applicable-recording-speed information storage circuit on the basis of either one or both of the lead-in start time information and the lead-out start time information reproduced by the time information reproducing circuit; a recording speed designating section that designates a particular recording speed value on the basis of an operation by a user; and a control circuit that performs recording on the optical disk after setting a recording speed for the optical disk to the particular recording speed value designated by the recording speed designating section. With this inventive optical disk recording device too, the user can set the recording speed to a speed value within the range of the displayed disk-applicable recording speeds by carrying out a manual input operation or the like while viewing the display on the display unit. Thus, the recording can be executed with minimized errors. Note that the time information reproducing circuit in this optical disk recording device reproduces the disk-applicable-recording-speed information from a particular disk area, such as the lead-in area, program area or lead-out area, where the information is pre-recorded.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE PREFERRED EMBODIMENTS

A description will hereinafter be given about preferred embodiments of a recordable optical disk (such as a CD-R or CD-RW) and an optical disk recording device, based on the CD-WO (Compact Disk-Write Once) or Orange Book standards, to which are applied the basic principles of the present invention. First, the inventive recordable optical disk will be described, in which pre-grooves (i.e., track guide grooves) are formed during the course of manufacture of the optical disk. Typically, each of the pre-grooves meanders or undulates at a frequency of 22.05 kHz to provide pre-groove wobbles where time information, called ATIP (Absolute Time In Pre-groove) information, is recorded in frequency-modulated (FM) form. The ATIP information in the lead-in area of the optical disk contains, as special information, information indicative of a lead-in start time, a lead-out start time, etc. According to the Orange Book standards, the lead-in start time and lead-out start time are selectable as desired by a maker or manufacturer of each optical disk. For example, for a 74 -min. optical disk, the lead-out start time may be either "74:00:00" or "74:30:10" as long as the lead-out start time is equal to or greater in value than 74:00:00 and the linear velocity, track pitch and radial position meet the Orange Book standards.

Thus, taking advantage of such flexibility in selecting the lead-in and lead-out start times, information indicative of recording speeds suitably applicable to the optical disk, i.e., disk-applicable-recording-speed information, is recorded in either one or both of the lead-in and lead-out areas on the optical disk of the present invention. In Table 1 below, there are shown exemplary correspondencies between values of the lead-out start time and the applicable recording speed in the case where the disk-applicable recording speeds are incorporated in the lead-out start time information; here, each numerical value immediately followed by "X" represents a speed increase ratio to the normal recording speed.

TABLE 1

| Lead-out Start Time. | Applicable Recording Speed |
| --- | --- |
| 74:30:00 | 1X–4X |
| 74:30:01 | 6X or lower |
| 74:30:02 | 8X or lower |
| 74:30:03 | 10X or lower |
| 74:30:04 | 12X or lower |
| 74:30:05 | 14X or lower |
| 74:30:06 | 16X or lower |
| : | : |

Figure 2:
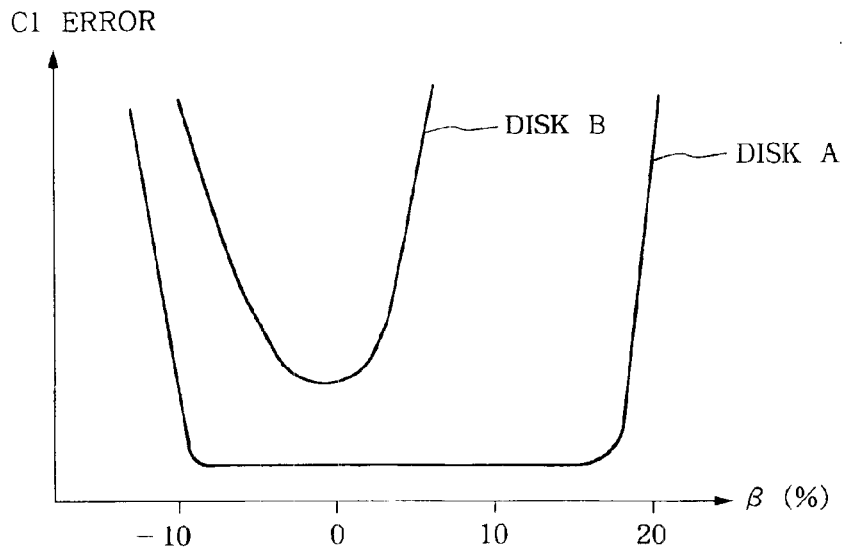
FIG. 2 is a diagram showing exemplary C1 error characteristics of two different optical disks subjected to eight-times speed recording.

Let's consider a case where recording is performed at an 8× (eight-times) speed on two optical disks A and B of different types and C1 error (error in the CD standards) characteristics detected through reproduction of the thus-recorded disks are as shown in FIG. 2. As shown in FIG. 2, the optical disk A has a wide C1 error margin versus β(%) which is a parameter defined in the Orange Book and relating to a reproduced signal quality, and is adaptable to the eight-times-speed recording. By contrast, the optical disk B has a narrow C1 error margin versus β(%) and is non-adaptable to the eight-times-speed recording. Therefore, when Table 1 is employed, the lead-out start times of the optical disks A and B are set to 74:30:02 and 74:30:00, respectively, in the preferred embodiment.

Also, in the preferred embodiment of the present invention, it is possible to record information indicative of lower and upper limit values of the applicable recording speeds separately, from each other. Table 2 and Table 3 below show exemplary correspondencies between the lead-in start time and the lower limit value of the recording speed and between the upper limit value of the recording speed and the lead-out start time, respectively, in such a situation where the lower limit value of the disk-applicable recording speeds is incorporated in the lead-in start time information and the upper limit value of the disk-applicable recording speeds is incorporated in the lead-out start time information.

TABLE 2

| Lead-in Start Time | Applicable Recording Speed (Lower Limit Value) |
| --- | --- |
| 97:30:00 | 1X |
| 97:30:01 | 0.5X |
| 97:30:02 | 2X |
| : | : |

TABLE 3

| Lead-out Start Time | Applicable Recording Speed (Upper Limit Value) |
| --- | --- |
| 74:30:00 | 4X |
| 74:30:01 | 6X |
| 74:30:02 | 8X |
| : | : |
| 74:30:06 | 16X |
| : | : |

According to Table 2 and Table 3, for an optical disk where are recorded the lead-in start time of 97:30:00 and the lead-out start time of 74:30:06, the lower and upper limit values of the disk-applicable recording speeds are set to "1×" (normal speed) and 16×, respectively. Conversely to the above, the upper limit value of the disk-applicable recording speeds may be incorporated in the lead-in start time information and the lower limit value of the disk-applicable recording speeds may be incorporated in the lead-out start time information.

Further, in the preferred embodiment of the present invention, both of the upper and lower limit values of the disk-applicable recording speeds may be combined into either one or both of the lead-in start time information and the lead-out start time information. Further, Table 4 below shows exemplary correspondencies between the lead-out start time and the upper and lower limit values of the disk-applicable recording speeds in the case where both of the upper and lower limit values of the disk-applicable recording speeds are combined into the lead-out start time information.

TABLE 4

| Lead-out Start Time | Applicable Recording Speed | |
|---|---|---|
| | (Lower Limit Value) | (Upper Limit Value) |
| 74:30:00 | — | 4X |
| 74:30:01 | — | 6X |
| 74:30:02 | — | 8X |
| : | : | : |
| 74:30:06 | — | 16X |
| 74:30:10 | 1X | — |
| 74:30:11 | 0.5X | — |
| 74:30:12 | 0.2X | — |
| : | : | : |
| 74:30:16 | 4X | — |

In the settings of Table 4, a numerical value "0" indicative of the upper limit value or a numerical value "1" indicative of the lower limit value is allocated to the ten's place in each frame of the lead-out start time information.

Lead-in and lead-out start times in the actual lead-in and lead-out areas of the optical disk can be made coincident with the lead-in and lead-out start information. Assuming that the disk-applicable-recording-speed information is allocated, as the lead-out start information, to nine frames from "74:30:00" to "74:30:09", the actual lead-out area can also start with "74:30:00" if the disk-applicable-recording-speed information is recorded as "74:30:00" or start with "74:30:09" if the disk-applicable-recording-speed information is recorded as "74:30:09". Similarly, assuming that the disk-applicable-recording-speed information is allocated, as the lead-in start information, to ten frames from "97:30:00" to "97:30:09", the actual lead-in area can also start with "97:30:00" if the disk-applicable-recording-speed information is recorded as "97:30:00" or start with "97:30:09" if the disk-applicable-recording-speed information is recorded as "97:30:09".

Alternatively, the lead-in and lead-out start times in the actual lead-in and lead-out areas can be made different from the lead-in and lead-out start information. Further, the lead-in and lead-out start time information may contain information indicative of the type, maker, etc. of the optical disk in question, in addition to the disk-applicable-recording-speed information.

Figure 1:
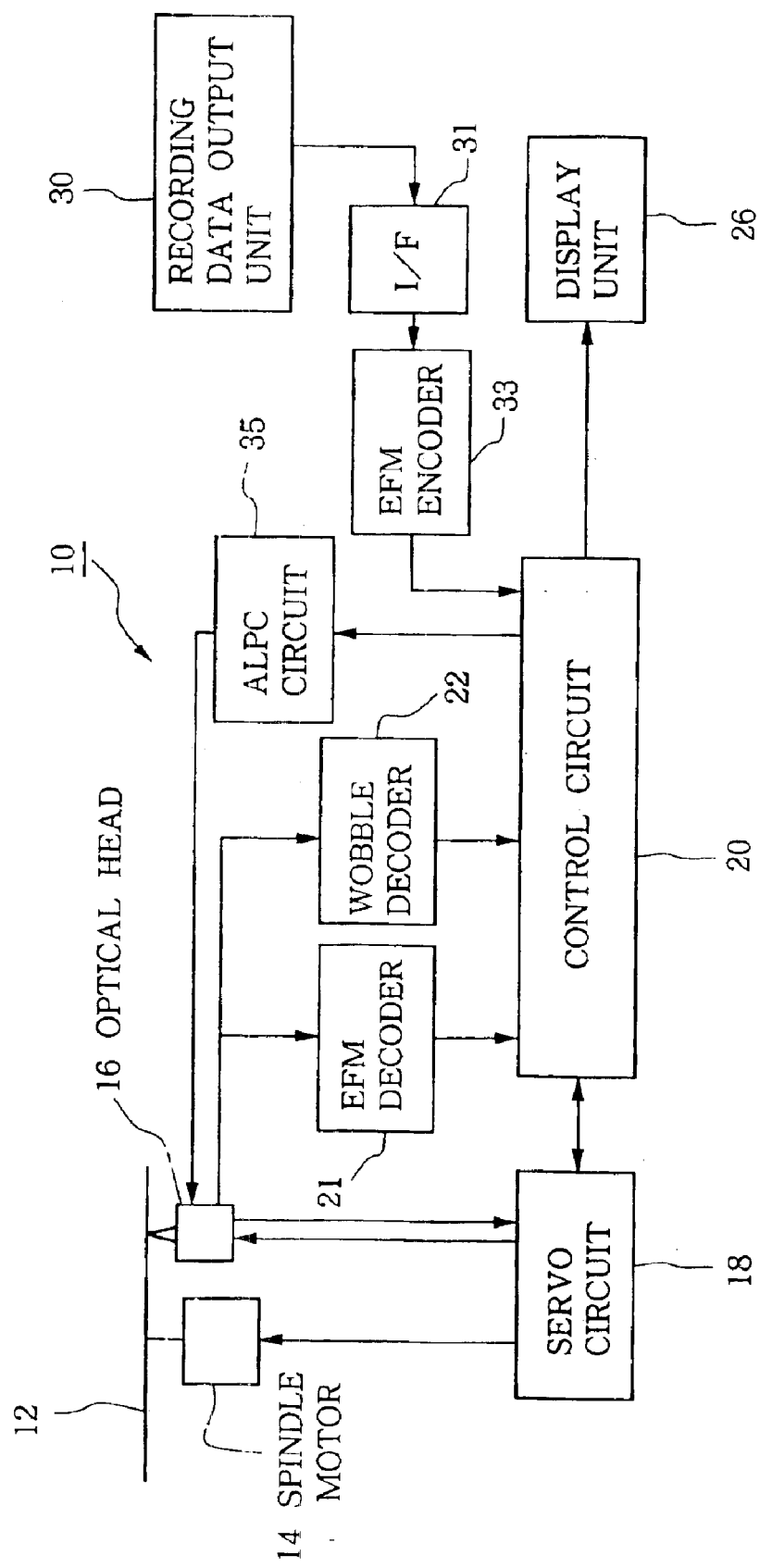
FIG. 1 is a block diagram of an optical disk recording device in accordance with a preferred embodiment of the present invention.

Next, the preferred embodiment of the optical disk recording device will be described with reference to FIG. 1, which is arranged to automatically set a recording speed in accordance with the lead-in or lead-out start time information or the lead-in and lead-out start time information This inventive optical disk recording device 10 can be constructed of either an optical disk drive alone or a combination of an optical disk drive and a computer. Optical disk 12 handled by the optical disk recording device 10 is the optical disk of the present invention as described in detail above. The optical disk 12 is driven to rotate by means of a spindle motor 14 so that an optical head 16 can write or read desired information to or from the optical disk 12. On the basis of a disk readout signal generated by the optical head 16 reading the optical disk to be recorded on and an instruction given from a control circuit 20, a servo circuit 18 controls the rotation of the spindle motor 14 and feed of the optical head 16 and also performs tracking control and focus control of the optical disk 12 as well known in the art.

EFM (Eight to Fourteen Modulation) decoder 21 EFM-decodes each disk readout signal that is output from the optical head 16 as the head 16 reads the optical disk 12 and passes the EFM-decoded signal to the control circuit 20. Wobble decoder 22 decodes, from among the disk readout signals from the optical head 16, ATIP information recorded in pre-groove wobbles of the optical disk 12 and passes the thus-decoded ATIP information to the control circuit 20. The wobble decoder 22 functions as a disk-applicable-recording-speed information reproducing circuit or a time information reproducing circuit in the inventive optical disk recording device. In the case where the optical disk 12 has the information indicative of the disk type and maker and the disk-applicable-recording-speed information recorded within the lead-in start time information and/or lead-out start time information, the wobble decoder 22 also decodes such information indicative of the disk type and maker.

The control circuit 20 has stored therein values of the lead-out start time and applicable recording speeds in corresponding relation to each other, as shown in Table 1 above. On the basis of the lead-out start time information reproduced during reproduction of the disk's lead-in area, the control circuit 20 determines a highest speed value which falls within the stored correspondencies between the lead-out start time and disk-applicable recording speeds and which can be set appropriately for the optical disk 12, and sets the recording speed for the optical disk 12 to the thus-determined highest speed value.

Recording data output unit 30, which comprises a hardware disk drive or the like, outputs recording data at a transfer rate corresponding to the recording speed having been set in the above-mentioned manner. The recording data output from the output unit 30 is sent via an interface circuit 31 to an EFM encoder 33 for encoding into the EFM format, and the thus-encoded data is delivered, via the control circuit 20 and an ALPC (Auto Laser Power Control) circuit 35, to the optical head 16, which, in turn, records the data onto the optical disk 12.

Figure 3:
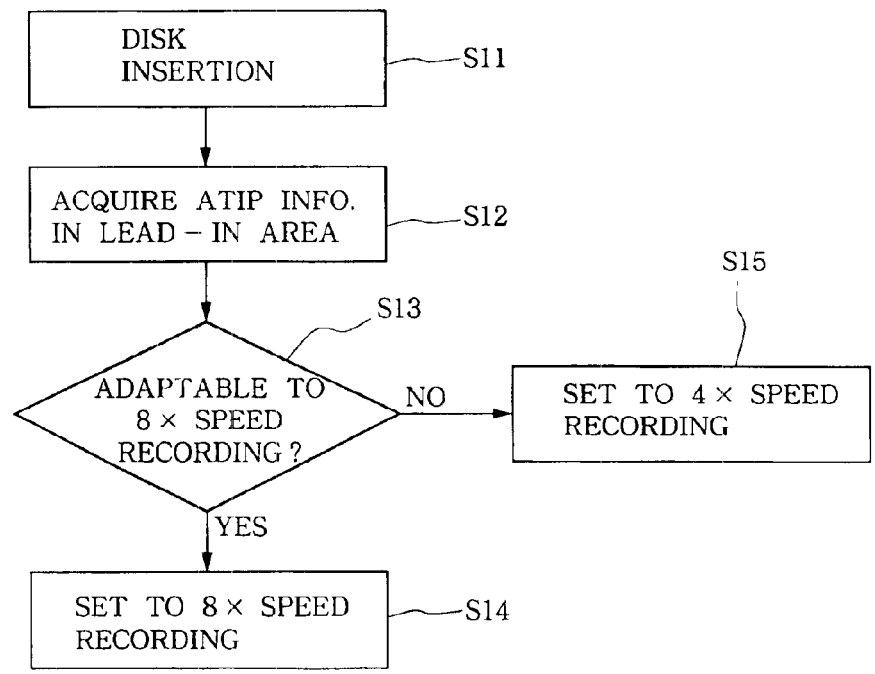
FIG. 3 is a flowchart showing an example of recording speed control performed by a control circuit in the optical disk recording device of FIG. 1.

FIG. 3 is a flow chart showing an example of recording speed control performed by the control circuit 20 in a situation where the optical disk drive is adaptable to recording at the four-time (quadruple) and eight-times speeds. Once an optical disk is inserted (step S11), the lead-in area of the inserted optical disk is read to acquire the ATIP information of the disk at step S12. Then, at step S13, it is determined, from the lead-out start time incorporated in the ATIP information, whether or not the inserted optical disk is adaptable to the eight-times speed recording, i.e., whether or not the upper limit value of the applicable recording speeds of the optical disk is 8× or over. If answered in the affirmative at step S13, the optical disk drive is set to the eight-times recording speed at step S14; if the inserted optical disk is not adaptable to the eight-times speed recording, the optical disk drive is set to the four-times recording speed at step S15. Such a series of control operations is carried out automatically. Once the recording speed is set in the above-mentioned manner, the control circuit 20 issues a recording start instruction, in response to which the optical head 16 is positioned at a predetermined recording start point, the spindle motor 14 is controlled to operate at a speed corresponding to the set recording speed and the recording data output unit 30 outputs recording data at a transfer rate corresponding to the set recording speed so that the recording data is recorded onto the optical disk 12 at the rate.

Figure 4:
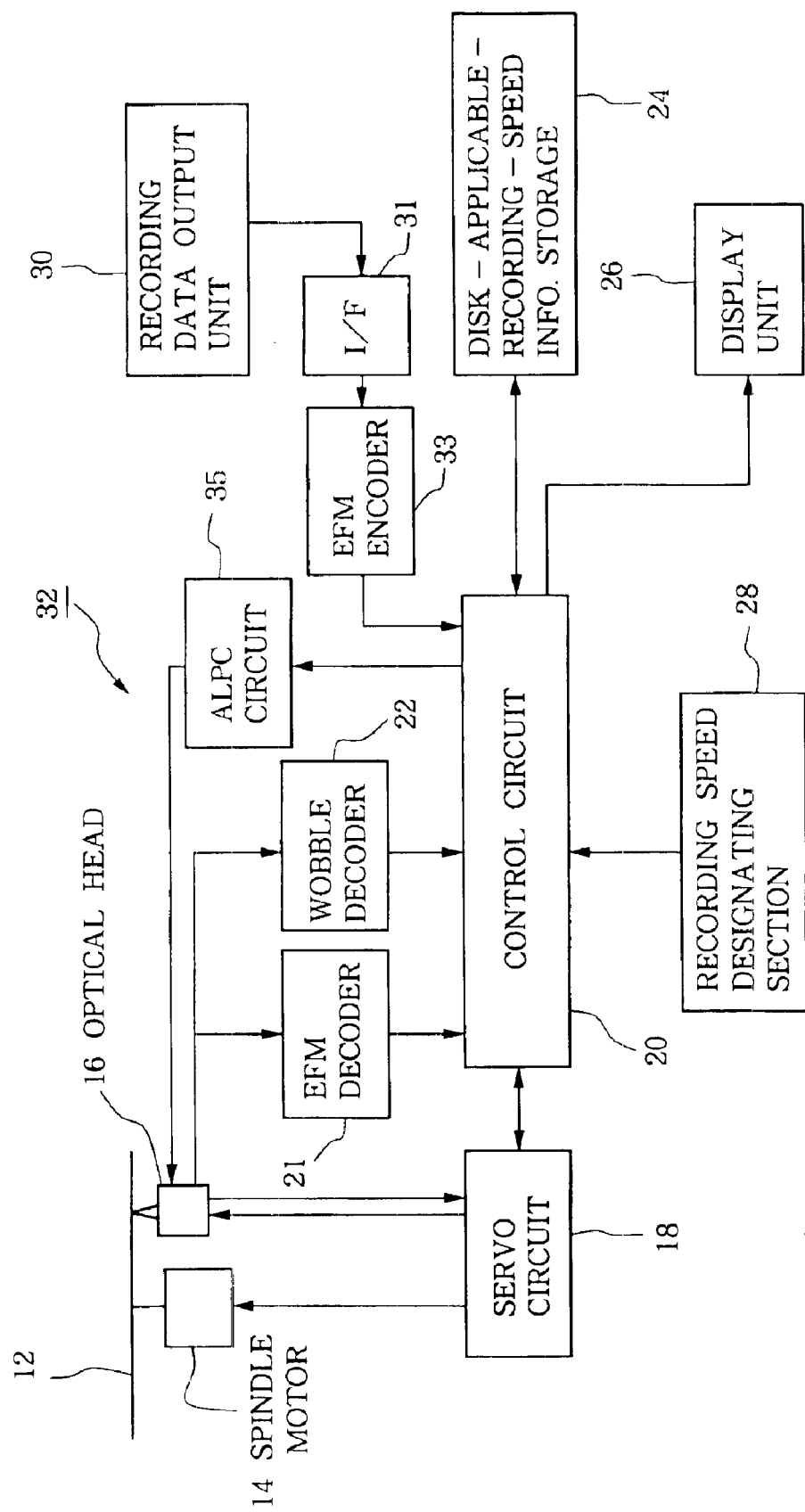
FIG. 4 is a block diagram of an optical disk recording device in accordance with another embodiment of the present invention.

Now, with reference to FIG. 4, an optical disk recording device in accordance with another embodiment of the present invention will be described where the recording speed is set manually in accordance with the lead-in or lead-out start time information or the lead-in and lead-out start time information. In FIG. 4, the same elements as in FIG. 1 are represented by the same reference characters. This optical disk recording device 32 can also be constructed of either an optical disk drive alone or a combination of an optical disk drive and a computer. Optical disk 12 handled by the optical disk recording device 32 is the optical disk of the present invention as detailed above. The optical disk 12 is driven to rotate by means of a spindle motor 14 so that an optical head 16 can write or read desired information to or from the optical disk 12. On the basis of a readout signal output from the optical head 16 and an instruction given from a control circuit 20, a servo circuit 18 controls the rotation of the spindle motor 14 and feed of the optical head 16 and also performs tracking control and focus control of the optical disk 12.

EFM (Eight to Fourteen Modulation) decoder 21 EFM-decodes each readout signal that is output from the optical head 16 as the head 16 reads the optical disk 12 and passes the EFM-decoded signal to the control circuit 20. Wobble decoder 22 decodes, from among the disk readout signals from the optical head 16, ATIP information recorded in pre-groove wobbles of the optical disk 12 and passes the thus-decoded ATIP information to the control circuit 20. The wobble decoder 22 functions as a disk-applicable-recording-speed information reproducing circuit or a time information reproducing circuit in the inventive optical disk recording device 32. In the case where the optical disk 12 has the information indicative of the disk type and maker as well as the disk-applicable-recording-speed information recorded within the lead-in start time information and/or lead-out start time information, the wobble decoder 22 also decodes such information indicative of the disk type and maker.

The optical disk recording device 32 according to the second embodiment of the present invention includes a disk-applicable-recording-speed information storage circuit 24, which has stored therein, for example, the information of Table 1 above as information representing correspondencies between values of the lead-out start time and the applicable recording speeds, the information of Table 2 and Table 3 above as information representing correspondencies between values of the lead-in start time and the lower limit value of the recording speeds and between values of the lead-out start time and the upper limit value of the recording speeds, or the information of Table 4 above as information representing correspondencies between values of the lead-out (or lead-in) start time and the upper and lower limit values of the applicable recording speeds. The control circuit 20 reads out, from the disk-applicable-recording-speed information storage circuit 24, each of the applicable recording speeds which corresponds to the lead-in or lead-out start time information (or lead-in and lead-out start time information) output from the wobble decoder 22.

Display unit 26 comprises a display panel or indicator of the optical disk drive, a display of the computer or the like, which visually shows the disk-applicable recording speeds read out from the disk-applicable-recording-speed information storage circuit 24. Recording speed designating section 28, which comprises, for example, a key switch of the optical disk drive or keyboard or mouse of the computer, can be used by a user or human operator to designate a particular recording speed on the basis of the disk-applicable recording speed values shown on the display unit 26.

Recording data output unit 30, which comprises a hardware disk drive or the like, outputs recording data at a transfer rate corresponding to the recording speed set in the above-mentioned manner. The recording data output from the output unit 30 is sent via an interface circuit 31 to an EFM encoder 33 for encoding into the EFM format, and the thus-encoded data is delivered, via the control circuit 20 and an ALPC circuit 35, to the optical head 16, which, in turn, records the data onto the optical disk 12.

Figure 5:
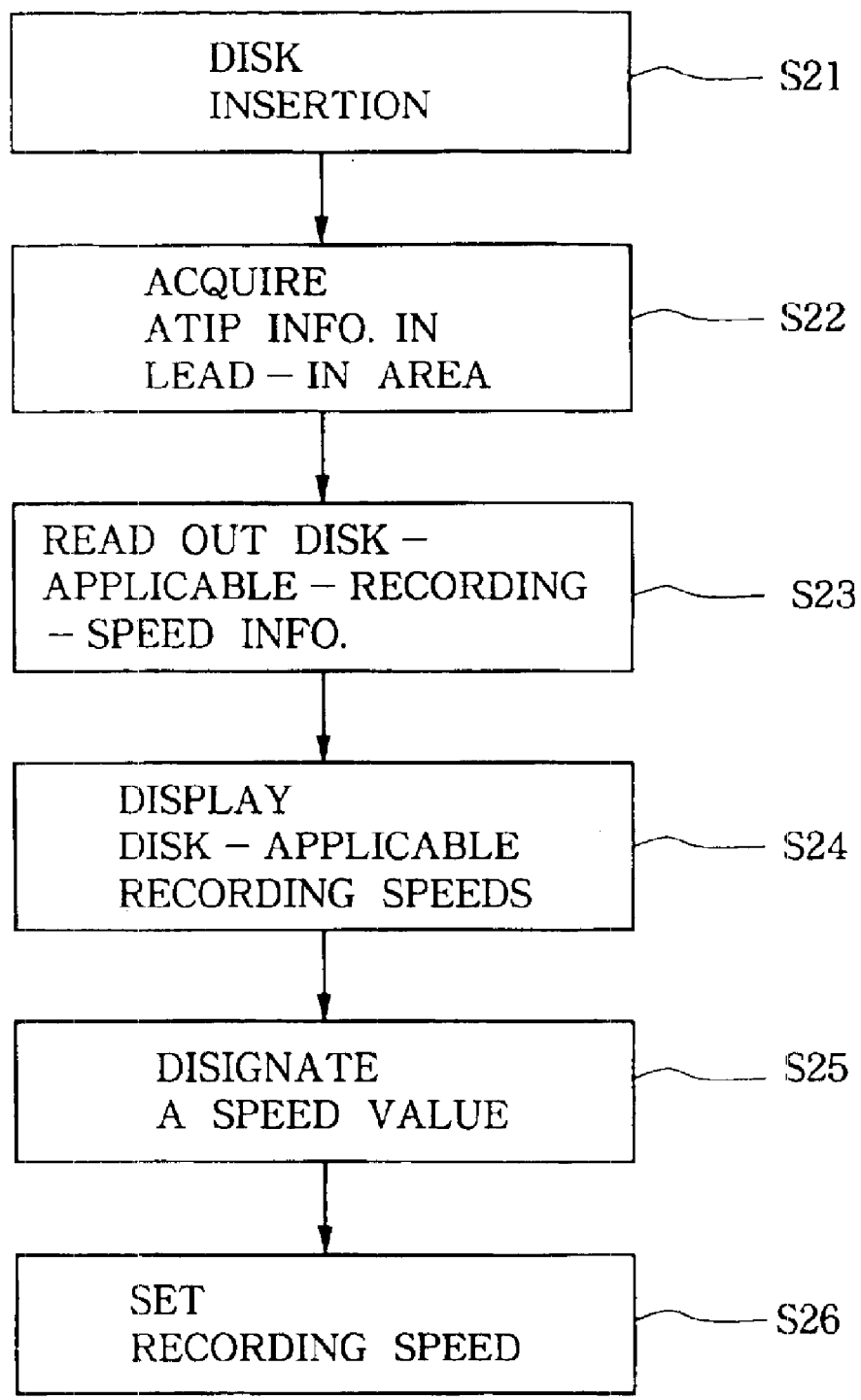
FIG. 5 is a flow chart showing an example of recording speed control performed by a control circuit in the optical disk recording device of FIG. 4.

FIG. 5 is a flow chart showing an example of recording speed control performed by the control circuit 20 in the optical disk recording device 32 of FIG. 4. Once an optical disk is inserted (step S12), the lead-in area of the inserted optical disk is read to acquire the ATIP information of the disk at step S22. At next step S23, the control circuit 20 reads out, from the disk-applicable-recording-speed information storage circuit 24, each of the disk-applicable recording speed values which corresponds to the lead-in or lead-out start time information (or lead-in and lead-out start time information) incorporated in the acquired ATIP information, so that the read-out applicable recording speed values are displayed on the display unit 26 at step S24. Then, at step S25, the human operator uses the recording speed designating section 28 to designate a particular recording speed value within the range of the disk-applicable recording speed values, with reference to the display on the display unit. In this way, one particular recording speed is set manually at step S26. Once the recording speed is thus set, the control circuit 20 issues a recording start instruction, in response to which the optical head 16 is positioned at a predetermined recording start point, the spindle motor 14 is controlled to operate at a speed corresponding to the set recording speed and the recording data output unit 30 outputs recording data at a transfer rate corresponding to the set recording speed so that the recording data is recorded onto the optical disk 12 at the rate.

Whereas the embodiments of the present invention have been described so far as including the disk-applicable-recording-speed information in the frame of the lead-in or lead-out start time information, the disk-applicable-recording-speed information may be incorporated in information indicative of a second or minute in the lead-in or lead-out start time information.

Further, while the present invention has been described so far in relation to the recordable optical disk and the optical disk recording device based on the Orange Book standards, it can also be applied to recordable optical disks and optical disk recording devices based on any other standards than the Orange Book standards. In the DVD (Digital Versatile Disk) standards for DVD-R, DVD-RW, etc., for example, various disk information, such as time information, is recorded in the pre-pits as well as in pre-groove wobbles during manufacture of the optical disk; thus, in this case, the disk-applicable-recording-speed information can be incorporated in the time information recorded in the pre-pits. In the case where the disk-applicable-recording-speed information is recorded in the pre-pits, the wobble decoder 22 of FIG. 1 or 4 is replaced by a pre-pit decoder to reproduce the disk-applicable-recording-speed information from the pre-pits.

What is claimed is:

1. A recordable optical disk where disk-applicable-recording-speed information indicative of applicable recording speeds for the optical disk is pre-recorded on a track of said optical disk during manufacture of the optical disk, wherein the disk-applicable-recording-speed information is pre-recorded in pre-groove wobbles or pre-pits of the optical disk, the disk-applicable-recording-speed information is information indicative of lower and upper limit values of the applicable recording speeds, and one of the lower and upper limit values of the applicable recording speeds is incorporated in lead-in start time information recorded in the pre-groove wobbles or pre-pits of the optical disk and another of the lower and upper limit values of the applicable recording speeds is incorporated in lead-out start time information recorded in the pre-groove wobbles or pre-pits of the optical disk.

2. An optical disk recording device for recording on a recordable optical disk where one of lower and upper limit values of disk-applicable recording speeds is incorporated in lead-in start time information recorded in pre-groove wobbles or pre-pits of the optical disk and another of the lower and upper limit values of the disk-applicable recording speeds is incorporated in lead-out start time information recorded in the pre-groove wobbles or pre-pits of the optical disk, said optical disk recording device comprising:

a time information reproducing circuit that reproduces, from among disk readout signals generated by reading the optical disk to be recorded on, the lead-in start time information and the lead-out start time information recorded in the pre-groove wobbles or pre-pits of the optical disk; and a control circuit that determines one of the lower and upper limit values of the disk-applicable recording speeds on the basis of the lead-in start time information reproduced by said time information reproducing circuit and another of the lower and upper limit values of the disk-applicable recording speeds on the basis of the lead-out start time information reproduced by said time information reproducing circuit and performs recording on the optical disk after setting a recording speed for the optical disk to a speed value within a range of the lower limit value to the upper limit value of the disk-applicable recording speeds.

3. An optical disk recording device comprising:

an disk-applicable-recording-speed information reproducing circuit that reproduces, from among disk readout signals generated by reading an optical disk to be recorded on, disk-applicable-recording-speed information pre-recorded on a track of the optical disk during manufacture of the optical disk;

a display unit that displays disk-applicable recording speeds on the basis of the disk-applicable-recording-speed information reproduced by said disk-applicable recording-speed information reproducing circuit;

a recording speed designating section that designates a particular recording speed value on the basis of an operation by a user; and a control circuit that performs recording on the optical disk after setting a recording speed for the optical disk to the particular recording speed value designated by said recording speed designating section.

4. An optical disk recording device as recited in claim 3 wherein the disk-applicable-recording-speed information reproducing circuit reproduces the disk-applicable-recording-speed information pre-recorded in pre-groove wobbles or pre-pits of the optical disk.

5. An optical disk recording device for recording on a recordable optical disk where disk-applicable-recording-speed information is incorporated in either one or both of lead-in start time information and lead-out start time information recorded in pre-groove wobbles or pre-pits of the optical disk during manufacture of the optical disk, said optical disk recording device comprising:

a disk-applicable-recording-speed information storage circuit that stores therein correspondencies between values of either one or both of the lead-in start time information and the lead-out start time information recorded in the pre-groove wobbles or pre-pits of the optical disk during manufacture of the optical disk and values of disk-applicable recording speeds;

a time information reproducing circuit that reproduces, from among disk readout signals generated by reading the optical disk to be recorded on, either one or both of the lead-in start time information and the lead-out start time information recorded in the pre-groove wobbles or pre-pits of the optical disk;

a display unit that displays the disk-applicable-recording-speed information that is read out from said disk-applicable-recording-speed information storage circuit based on either one or both of the lead-in start time information and the lead-out start time information reproduced by said time information reproducing circuit;

a recording speed designating section that designates a particular recording speed value based on an operation by a user; and a control circuit that performs recording on the optical disk after setting a recording speed for the optical disk to the particular recording speed value designated by said recording speed designating section.

* * * * *